United States Patent [19]

Kahlman et al.

[11] Patent Number: 5,142,421

[45] Date of Patent: Aug. 25, 1992

[54] DEVICE FOR RECORDING A DIGITAL INFORMATION SIGNAL ON A RECORD CARRIER

[75] Inventors: Josephus A. H. M. Kahlman; Wilhelmus J. van Gestel, both of Eindhoven, Netherlands

[73] Assignee: U.S. Philips Corporation, New York, N.Y.

[21] Appl. No.: 712,167

[22] Filed: Jun. 6, 1991

[30] Foreign Application Priority Data

Sep. 21, 1990 [NL] Netherlands .................. 9002069
Dec. 17, 1990 [NL] Netherlands .................. 9002772

[51] Int. Cl.⁵ .............................. G11B 5/09
[52] U.S. Cl. ........................ 360/40; 341/59
[58] Field of Search ............ 360/39, 40; 375/19, 375/20; 341/55, 59

[56] References Cited

U.S. PATENT DOCUMENTS 4,750,138 6/1988 Schouhamer Immink .......... 360/40

Primary Examiner—Vincent P. Canney
Attorney, Agent, or Firm—Leroy Eason

[57] ABSTRACT

A device for recording n-bit information words on a magnetic record carrier. A 1-bit digital word is affixed to each successive information word. The resulting (n+1)-bit information words are then encoded in an aT precoder into (n+1)-bit channel words (cW) which are recorded on the record carrier. The 1-bit digital words which are affixed are such that the running digital sum value of the output signal of the precoder has a desired pattern as a function of time. Consequently, for example, a pilot signal can be inserted into the channel word data stream which may be used to control tracking during reproduction of the recorded information from the record carrier. The values of a and n are such that a $\geq 2$ and $n \geq 1$. Preferably, $n << 1$, for example, $n \leq 10$.

15 Claims, 10 Drawing Sheets

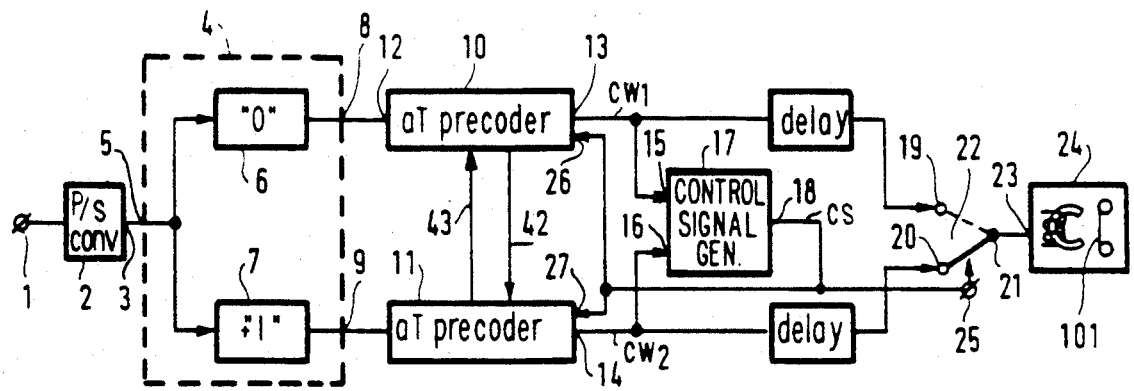
FIG.1
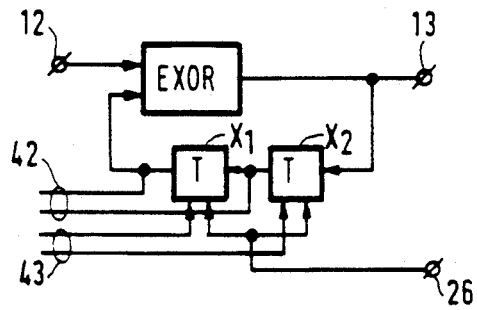
FIG.2
| contents precoder $X_1$ $X_2$ | (0) 0 1 1 0 0 0 1 0 1 1 0 1 0 1 1 0 0 0 1 1 1 1 0 1 | disparity |
|---|---|---|
| 0   0 | 0 0 1 1 1 1 1 0 1 1 0 1 1 1 0 0 0 0 0 1 1 0 0 0 1 | +1 |
| 0   1 | 0 1 1 0 1 0 1 1 1 0 0 0 1 0 0 1 0 1 0 0 1 1 0 1 1 | +1 |
| 1   0 | 1 0 0 1 0 1 0 0 0 1 1 1 0 1 1 0 1 0 1 1 0 0 1 0 0 | −1 |
| 1   1 | 1 1 0 0 0 0 0 1 0 0 1 0 0 0 1 1 1 1 0 0 1 1 1 0 | −1 |
| contents precoder $X_1$ $X_2$ | (1) 0 1 1 0 0 0 1 0 1 1 0 1 0 1 1 0 0 0 1 1 1 1 0 1 | disparity |
| 0   0 | 1 0 0 1 0 1 0 0 0 1 1 1 0 1 1 0 1 0 1 1 0 0 1 0 0 | −1 |
| 0   1 | 1 1 0 0 0 0 0 1 0 0 1 0 0 0 1 1 1 1 0 0 1 1 1 0 | −1 |
| 1   0 | 0 0 1 1 1 1 1 0 1 1 0 1 1 1 0 0 0 0 0 1 1 0 0 0 1 | 1 |
| 1   1 | 0 1 1 0 1 0 1 1 1 0 0 0 1 0 0 1 0 1 0 0 1 1 0 1 1 | 1 |
FIG.3

| | contents precoder | (0) 0 0 0 0 0 0 0 0 0 0 0 0 0 0 0 0 0 0 0 0 0 0 0 1 | disparity |
|---|---|---|---|
| 1T precoder | 0 | 0 0 0 0 0 0 0 0 0 0 0 0 0 0 0 0 0 0 0 0 0 0 0 1 | -23 |
| 2T precoder | 0 1 | 0 1 0 1 0 1 0 1 0 1 0 1 0 1 0 1 0 1 0 1 0 1 1 | 1 |
| 3T precoder | 1 0 1 | 1 0 1 1 0 1 1 0 1 1 0 1 1 0 1 1 0 1 1 0 1 1 | +9 |
FIG. 6a
| | contents precoder | (1) 0 0 0 0 0 0 0 0 0 0 0 0 0 0 0 0 0 0 0 0 0 0 0 1 | disparity |
|---|---|---|---|
| 1T precoder | 0 | 1 1 1 1 1 1 1 1 1 1 1 1 1 1 1 1 1 1 1 1 1 1 1 0 | +23 |
| 2T precoder | 0 1 | 1 1 1 1 1 1 1 1 1 1 1 1 1 1 1 1 1 1 1 1 1 1 1 0 | +23 |
| 3T precoder | 1 0 1 | 0 0 1 0 0 1 0 0 1 0 0 1 0 0 1 0 0 1 0 0 1 1 | -7 |
FIG. 6b
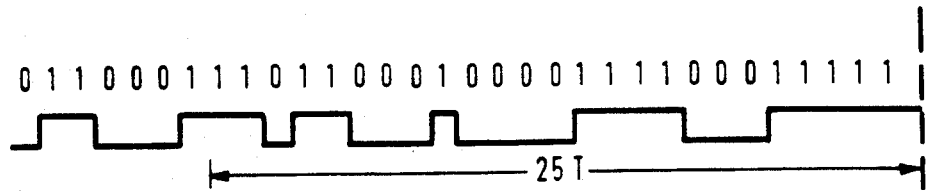
FIG. 7a
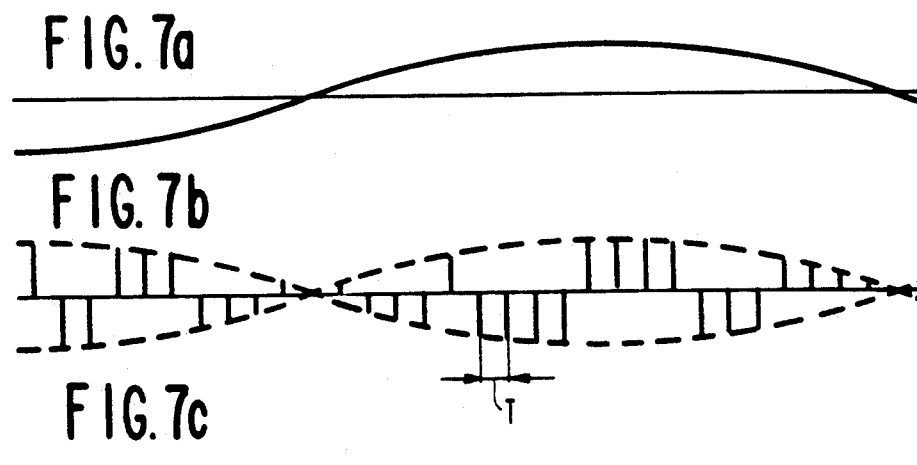
FIG. 7b
FIG. 7c contents precoder = 0 1   CW

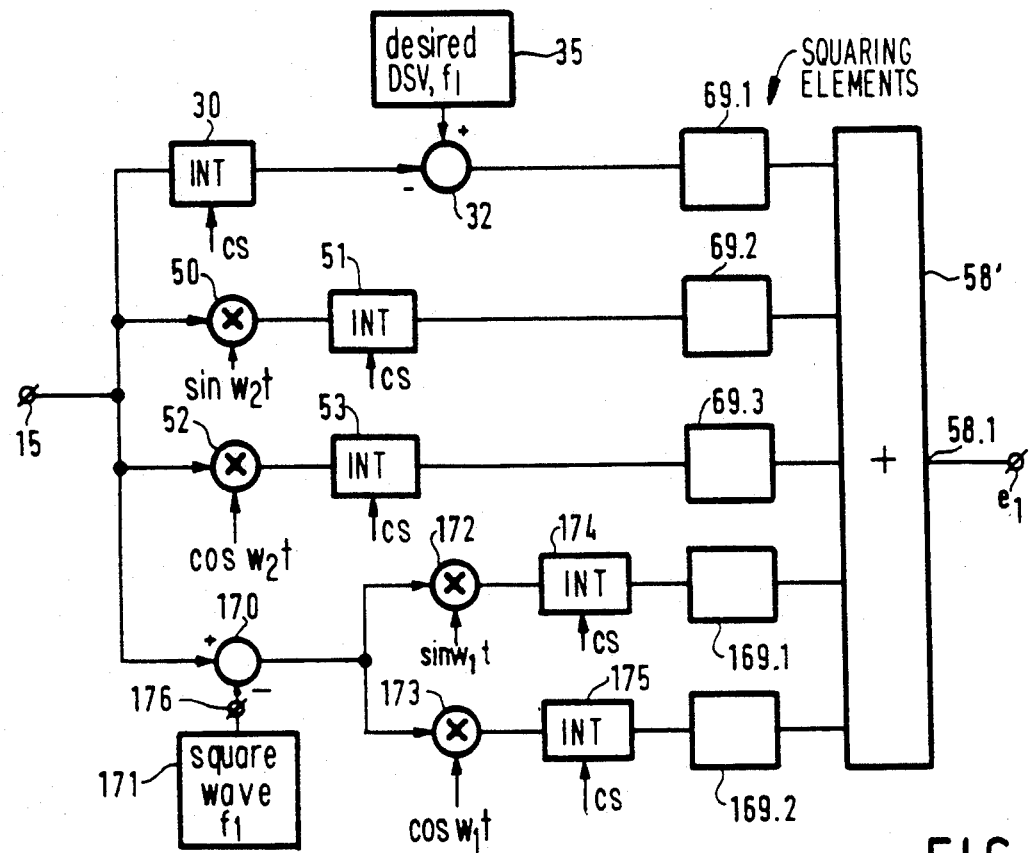
FIG.17
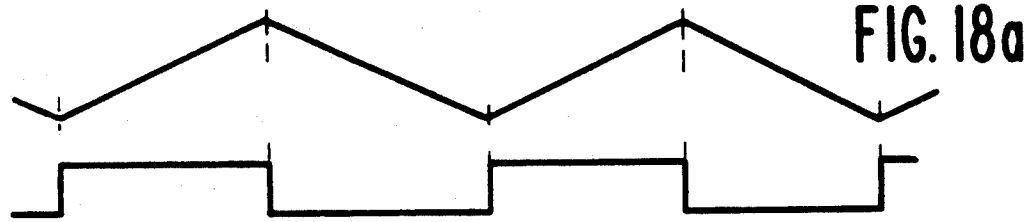
FIG.18a
FIG.18b
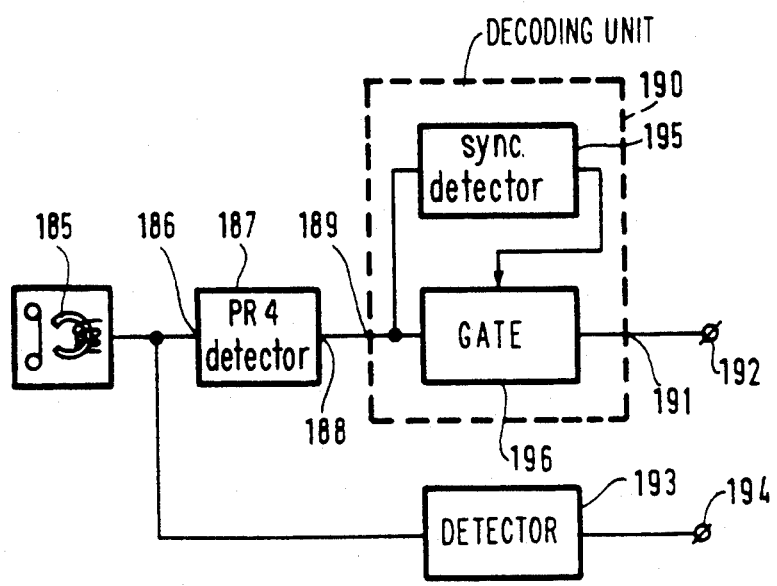
FIG.19

DEVICE FOR RECORDING A DIGITAL INFORMATION SIGNAL ON A RECORD CARRIER

RELATED APPLICATION

This invention is related to copending application Ser. No. 07/712,166, filed concurrently herewith, of which one of the inventors hereof is a named co-inventor. Both relate to encoding of a digital information signal so as to adjust the running digital sum value thereof, but provide different modes of such encoding.

BACKGROUND OF THE INVENTION

1. Field of the Invention

The invention relates to a device for recording a digital information signal in an information track on a magnetic record carrier, and for converting, prior to recording, n-bit information words in the presented digital information signal into (n+m)-bit channel words, where n and m are integers and for which holds $m \geq 1$ and $n > m$, comprising an input terminal for receiving the n-bit information words, an encoding device having an input coupled to the input terminal and having an output, which encoding device comprises an aT precoder, a being an integer greater than or equal to two and T being the bit period of the information words, which encoding device is arranged for converting the n-bit information words into the (n+m)-bit channel words and for presenting the channel words at the output, a recording device having an input coupled to the output of the encoding device, for recording the (n+m)-bit channel words in the information track on the magnetic record carrier.

2. Description of the Related Art

A device of this type is known, for example, from European Patent Application No. 339,724. In such prior-art device an encoding is described according to which an n-bit information word by utilizing is converted into an (n+m)-bit channel word a look-up Table is, subsequent to which the channel word is applied by means of a 2T precoder to a recording device which records the thus encoded (n+m)-bit channel word is on a magnetic record carrier. In this context NRZ-I recording is denoted. More specifically, an 8-to-10 bit conversion is described in which for each 8-bit information word at least three 10-bit words from the aforementioned Table each having a mutually different disparity are available.

With an appropriate selection from these three 10-bit words the running digital sum value in the serial channel word data stream at the output of the precoder can be controlled in such a way that a desired variation of this running digital sum value is realised as a function of time.

In above publication a pilot signal is thus accommodated in the serial data stream, which pilot signal when reproduced from the record carrier may, for example, be used to control tracking.

SUMMARY OF THE INVENTION

It is an object of the invention to propose a device with which it is also possible to adjust as desired the running digital sum value as a function of time, but in which a different encoding is used which encoding may have a simpler structure and incorporates the possibility to provide high-efficiency encoding.

For this purpose, the device according to the invention is characterized in that the encoding device comprises signal affixing means for affixing each time an m-bit digital word, where m is equal to 1, to a consecutive n-bit information word to obtain an (n+1)-bit information word, in that the aT precoder is arranged for converting the (n+1)-bit information words into (n+1)-bit channel words, in that the encoding device further includes control signal generating means, in that the control signal generating means is arranged for receiving the (n+1)-bit channel words from the aT precoder and for deriving a control signal from the (n+1)-bit channel words, and in that the signal affixing means is arranged for affixing a 1-bit digital word to an n-bit information word in response to this control signal, so that the running digital sum value in the output signal of the precoder plotted against time shows a behaviour according to a desired pattern.

In this connection it should be observed that it is pre-eminent that an aT precoder be used for which it holds that $a \geq 2$. Firstly, the choice of the precoder is determined by the detection mechanism applied on the reproduction side. In magnetic recording often a PR4 detection is concerned, that is to say, a partial response class 4 detection. This detection is known per se and requires no further explanation. It does mean, however, that on the recording side a 2T precoder is then desired to avoid error propagation.

In addition, in suchlike systems, it is important that the $T_{max}$ in the serial channel word data stream, that is to say, the maximum number of successive "zeros" or "ones" in this data stream, does not exceed a specific value.

The insertion of a 1-bit digital word into the digital information, combined with an encoding by means of an aT precoder provides the option to restrict the $T_{max}$. In a precoder with $a \geq 2$ this restriction is more effective than in a 1T precoder.

Encoding the n-bit information words into (n+1)-bit channel words in the device according to the invention is thus realised in a very simple manner by providing a 1-bit digital word preceding the n-bit information words. From the (n+1)-bit information word thus obtained the n most significant bits are those of the original n-bit information word. Thus, no look-up Table as in the prior-art device is necessary any more.

In addition, by selecting n to be greater than or equal to 10, a highly efficient encoding can be realised. For example, if n is assumed to be equal to 24, one will attain 96% efficiency. This is very high compared to the efficiency of the encoding described in aforementioned publication.

It should be observed that the invention is not only applicable to digital information systems solely containing successive n-bit information words, which means that the 1-bit digital words are inserted into the data stream of the digital information signal at equidistant instants. The 1-bit digital words may also be inserted at instants which are not all equidistant. For example, it could be assumed that the digital information signal is composed of alternate n-bit and p-bit information words, a 1-bit digital word being affixed to each n-bit information word and a q-bit digital word being affixed to each p-bit information word, whilst it holds that $p \neq n$, and q is an integer which might be equal to 1. Affixing the q-bit digital words to the p-bit information words may be effected in the same manner as the 1-bit digital words are affixed to the n-bit information words.

It should further be observed in this respect that from European Patent Application No. 250.049 it is known that in a recording device comprising an aT precoder an a-bit digital word is affixed to n-bit information words, for influencing the running digital sum value in the precoder output signal. In that publication it is stated that each time as many bits are to be affixed to an n-bit information word as there are memory elements in the aT precoder. Therefore, in the prior-art device comprising a 1T precoder 1-bit digital words are affixed to the information words and thus 2-bit digital words are affixed to the information words in the device comprising a 2T precoder.

When a 1T precoder is used, the affixing of a 1-bit digital word is sufficient for sign inversion of all the bits of the obtained channel word after precoding, and sufficient to control in this fashion the running digital sum value in the precoder output signal. When a 2T precoder is used, a 2-bit digital word is to be affixed to influence the sign of all the bits of the obtained channel word after precoding.

According to the invention it will now be sufficient for a device comprising a 2(or over)T precoder to affix only a single bit to an n-bit information word. It is true, the affixing of this single bit makes it possible to realise sign inversion for only half the number of bits of the obtained channel word. However, it has turned out that this is sufficient for controlling the running digital sum value of the precoder output signal. In addition, there is the major advantage of a higher efficiency in the encoding compared to the encodings known from European Patent Application No. 250.049.

BRIEF DESCRIPTION OF THE DRAWINGS

The invention will be further explained in the following descriptions of the Figures with reference to a number of exemplary embodiments, in which:

FIG. 1 shows a first exemplary embodiment of the device according to the invention;

FIG. 2 shows a 2T precoder;

FIG. 3 shows the conversion from a 24-bit information word to a 25-bit channel word;

FIGS. 6a and b shows a conversion from a 24-bit information word to a 25-bit channel word for a 1T precoder, a 2T precoder and a 3T precoder;

FIGS. 7a, b and c shows a further explanation of the operation of the control signal generating means shown in FIG. 5, if a dip is to be realised with a certain frequency;

FIG. 17 shows an extension to the control signal generating means shown in FIG. 5;

FIG. 18 shows two signals occurring in the circuit shown in FIG. 17;

FIG. 19 shows a reproduction device for reading and decoding the serial data stream of the (n+1)-bit channel words;

DESCRIPTION OF THE PREFERRED EMBODIMENTS

Figure 4:
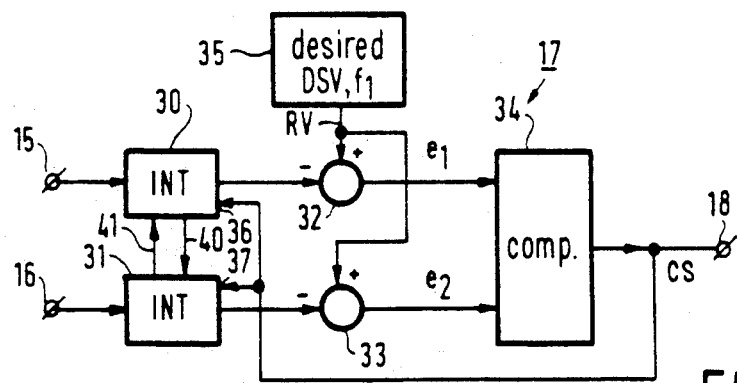
FIG. 4 shows a further embodiment of the control signal generating means.

FIG. 1 shows a first embodiment of the novel device comprising an input terminal 1 coupled to a parallel-to-serial converter 2. For example, 8-bit digital words at input terminal 1 are successively applied in parallel to the converter 2. The converter 2 converts, again by way of example, three of these 8-bit digital words into a single 24-bit digital information word which is presented at the output 3. The device comprises signal affixing means 4. The signal affixing means 4 is arranged for affixing a 1-bit digital word to successive n(=24)-bit information words presented at input 5. The means 4 thereto comprises a first unit 6 in which a "0" is affixed to the 24-bit information word, that is to say, prefixed the 24-bit information word, and a second unit 7 in which a "1" is prefixed to the 24-bit information word. The 25-bit information words thus obtained are conveyed to outputs 8 and 9 respectively, and through these outputs applied each to an aT precoder 10 and 11 respectively, a being an integer greater than or equal to 2.

FIG. 2 shows a 2T precoder. Precoders of this type are known per se. In a precoder of this type the output signal of the EXOR, available at the output 13, is delayed over the clock period T of the input signal and fed back to the input of the EXOR. The clock period T is the clock period of the serial digital signal applied to the aT precoders 10 and 11. The precoders 10 and 11 convert the (n+1)-bit information words applied to their inputs into (n+1)-bit channel words available at outputs 13 and 14 respectively. The outputs 13 and 14 of the precoders 10 and 11 respectively, are coupled to inputs 15 and 16 respectively, of control signal generating means 17, which generates a control signal cs at the output 18 in dependence on the (n+1)-bit channel words. The outputs 13 and 14 of the precoders 10 and 11 are further coupled to the respective terminals 19 and 20 of controllable switching means 22. A terminal of the switching means 22 is coupled to an input 23 of a recording device 24. The output 18 of the means 17 is coupled to a control signal input 25 of the switching means 22 and to control signal inputs 26 and 27 of aT precoders 10 and 11 respectively.

A possible embodiment of the control signal generating means 17 is shown in FIG. 4. It comprises integrators 30 and 31 whose inputs are coupled to the respective inputs 15 and 16. The outputs of the integrators are coupled to first inputs of signal combining units 32 and 33 respectively. The outputs of the combining units 32 and 33 are coupled to inputs of a comparator 34 of which one input is coupled to the output 18 at which the control signal cs is produced.

The control signal generating means 17 comprises, if so desired, a signal generator 35 whose input is coupled to second inputs of the combining units 32 and 33. Self-evidently, if the signal generator 35 is absent, also the combining units 32 and 33 can be omitted. The signal combining units 32 and 33 operate as subtractors as will be clear from the following. Furthermore, the output of the comparator 34 is coupled to control signal inputs 36 and 37 of the integrators 30 and 31 respectively.

The operation of the device shown in FIG. 1 is as follows. As observed hereinbefore, the 24-bit information words are applied to the affixing units 6 and 7. At the outputs 8 and 9 respectively, 25-bit information words appear, 24 bits of which (in this example the least significant bits) representing the original 24-bit information word and a "0" being affixed as the most significant bit in one case (unit 6) and a "1" being affixed in the other case (unit 7).

FIGS. 3a and 3b show examples of two 25-bit information words realised in this fashion. The centre column in the tables shows, above the horizontal line, a 25-bit digital information word. The affixed (1-bit) digital number is represented here in brackets.

Depending on the contents ($x_1$, $x_2$) of the two memories in the precoders (compare the left columns in FIGS. 3a and 3b) these precoders produce one of the four 25-bit channel words as they are represented in the center column in the Tables of FIGS. 3a and 3b.

When comparing the two 25-bit channel words obtained in the precoders 6 and 7, with identical contents ($x_1$, $x_2$) of the memories in these precoders, the result is that two 25-bit channel words are obtained of which the even bits are equal to each other, but the odd bits are each other's inverse. This property is highly advantageous and relates to the fact that an aT precoder is used where a is equal to 2. This will be further explained with reference to FIG. 6. FIG. 6 shows how a 24-bit information word which consists of practically all "zeros" is converted by a 1 T precoder, a 2 T precoder and a 3 T precoder for the two situations in which in one case a "0" is prefixed to the 24-bit information word (FIG. 6a) and in the other case a "1" is prefixed (FIG. 6b).

FIG. 6 shows that a 10 T precoder with a certain content of the (single) memory in the precoder, which content in this case is assumed to be equal to "0", has encoded the 25-bit information word into a 25-bit channel word so that the $T_{max}$, i.e. the maximum number of successive "zeros" or "ones" in the serial data stream of the 25-bit channel words, has practically not changed compared to the $T_{max}$ in the serial data stream of the 25-bit information words. This holds both for the case where the affixing means 4 has affixed a "0" and where it has affixed a "1", irrespective of the content of the precoder prior to the encoding of the information word concerned.

If the affixing means, more specifically unit 6, has affixed a "0" to the 24-bit information word, the 2 T precoder will produce a 25-bit channel word in which the number of successive "zeros" and "ones" is drastically reduced, cf. FIG. 6a. Consequently, one is better capable of keeping the $T_{max}$ under control in the serial channel word data stream.

The 2 T precoder does not produce any improvement in the $T_{max}$, cf. FIG. 6b, it is true, for the case where a "1" has been affixed by the affixing means, more specifically unit 7. The disparity of this 25-bit channel word, i.e. 23, cf. FIG. 6b, is unfavourable (unfavourably high) compared to the disparity of the 25-bit channel word produced by unit 6, i.e. 1, cf. FIG. 6a, to such an extent that generally the 25-bit channel word produced by unit 6 will be selected in the selecting stage to be discussed hereinafter. A reasoning analogous to the one described above also holds for the other contingent content of the precoder prior to encoding.

When a 3 T precoder is used, it is evident from FIG. 6 that in both cases the number of successive "zeros" and "ones" in the 25-bit channel words is smaller than in the corresponding 25-bit information words. In general, for the other contingent content of the precoder prior to encoding there is a reasoning which is again analogous to the reasoning provided when the 2 T precoder was discussed.

Therefore, in conclusion it may be stated that when an aT precoder is used for which holds a $\geq 2$, the $T_{max}$ in the serial data stream of the channel words can be controlled better.

The two 25-bit channel words $CW_1$ and $CW_2$ derived by the precoders 10 and 11 are applied to the switching means 22 and to the generating unit 17. In the unit 17, by means of integrator 30, cf. FIG. 4, the disparity of the channel word $CW_1$ of the precoder 10 is added to a value already present in the integrator. This value corresponds to the running digital sum value of the serial data stream of the channel words as applied to the terminal 21 of the switching means 22.

Similarly, by means of the integrator 31, the disparity of the channel word $CW_2$ of the precoder 11 is added to a value present in the integrator 31. This value too corresponds to the running digital sum value of the serial data stream of the channel words available at terminal 21, and is thus equal to the value available in the integrator 30. The signal generator 35 produces a signal RV corresponding to the desired digital sum value in the serial data stream of the channel words at terminal 21.

By means of subtraction in the combining units 32 and 33 two error signals $e_1$ and $e_2$ are obtained which show how much the digital sum value in the serial data stream, having the channel word $CW_1$, $CW_2$ respectively, as a last channel word, deviates from the desired digital sum value. In the comparator 34 a choice is made for the error signal having the smaller absolute value. Thus, if the error signal $e_1$ proves to be the smaller, a control signal $cs_1$ is produced at output 18 so that the switching means 22 assumes the position in which the terminals 19 and 21 are coupled to each other. The channel word $CW_1$ can now be applied as the next channel word to the input 23 of the recording means 24. The delays in the lines from the outputs 13 and 14 to the switching means 22 are intended to compensate for the time necessary for deriving the control signal in the detector 17.

In addition, under the influence of this control signal $cs_1$, which is applied to the control signal inputs 36 and 37, the value in the integrator 30 is transferred to the integrator 31 through line 40 so that the two integrators have stored again the same running digital sum value in their memories.

Also under the influence of this control signal $cs_1$ the contents ($x_1$, $x_2$) of the memories in the precoder 10 which contents are applied to the control signal inputs 26 and 27 of the precoders 10 and 11 are transferred to the two memories of the precoder 11 through the line 42 so that the memories of the two precoders again have the same contents $(x_1, x_2)$.

If the error signal $e_2$ proves to be the smaller, a control signal $cs_2$ is generated so that under the influence of this control signal the switching means 22 assumes the position shown in the drawing, see FIG. 1, and the terminals 20 and 21 are coupled to each other. The channel word $CW_2$ is applied to the recording means 24 as the next channel word in the serial channel word data stream. In addition, under the influence of the control signal $cs_2$, the value stored in the memory of integrator 31 is applied to the memory of the integrator 31 through line 41 and stored in this memory, while the content $(x_1, x_2)$ of the precoder 11 is stored in the memories of the precoder 10 through line 43.

For the case where the error signals $e_1$ and $e_2$ show parity it may be decided, for example, always to generate the control signal $cs_1$.

By means of the device described hereinbefore, a digital signal free from DC current can be produced at the input 23 of the recording means 24. In fact, this signal is produced because the adjustment is such that the running digital sum value in this signal is adjusted to zero. This may be effected by means of the control signal generator of FIG. 4, in the absence of the signal generator 35 and the subtractors 32 and 33, or by enabling the generator 35 to produce a zero signal. By inserting the generator 35 and the subtractors 32 and 33, a pilot signal may additionally be inserted in the digital data stream. The integral of this pilot signal will then have the form of the desired variation of the digital sum value as a function of time as provided by the generator 35.

Making this encoding free from DC current and adding a pilot signal to the code in the form of a desired variation of the digital sum value is a prior-art technique. For example, the reader be referred to aforementioned European Patent Application No. 339,724.

Figure 5:
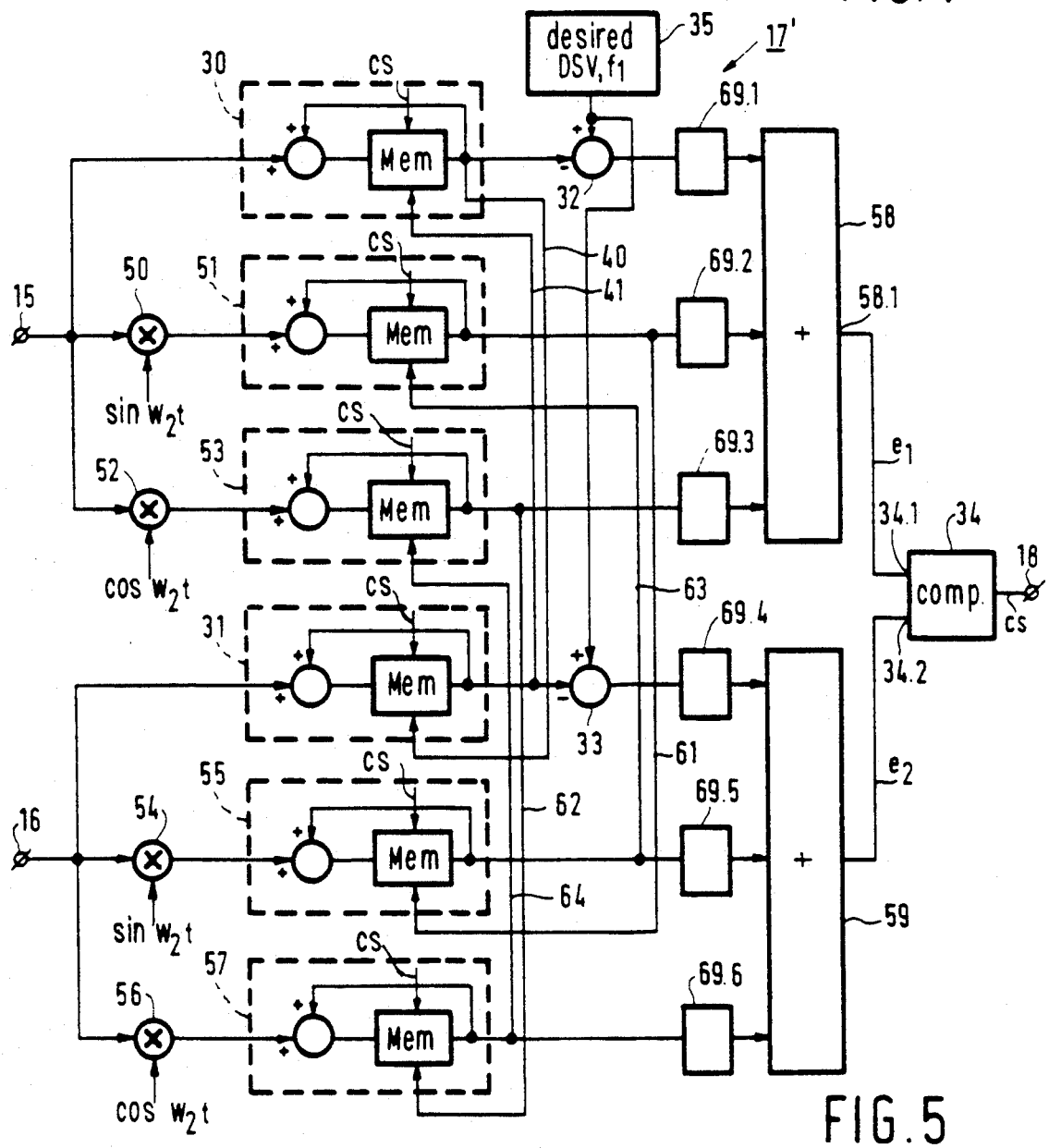
FIG. 5 shows another embodiment of the control signal generating means.

FIG. 5 shows another embodiment of the control signal generating means 17'. With this control signal generating means 17' both a dip at $f=0$ Hz (that is to say, free from DC current), and a pilot signal at a specific frequency $f_1$ be realised, as can a dip at a second frequency $f_2 (=w_2/2\pi)$.

The control signal generating means 17' thereto further comprises multipliers 50, 52, 54 and 56, integrators 51, 53, 55 and 57, two signal combining units 58 and 59 and squaring elements 69.1 to 69.6. The integrators 51, 53, 55 and 57 are arranged in the same manner as the integrators 30 and 31. The channel word $CW_1$ is applied through the input 15 to first inputs of the multipliers 50 and 52. In the multipliers 50 and 52 the channel word $CW_1$ is multiplied by $\sin w_2 t$ and $\cos w_2 t$ respectively. FIG. 7 shows how this multiplication is carried out for successive channel words. FIG. 7a shows the serial data stream of the channel words plotted against time, in which the last channel word and part of the penultimate channel word is shown FIG. 7b shows the variation of $\sin w_2 t$ (or $\cos w_2 t$) plotted against time and FIG. 7c the multiplications which are successive values of the sine or cosine function respectively. In the integrators 51 and 53 these values which are obtained for each channel word $CW_1$ are added to the value already present in the memory (Mem) in the integrators 51 and 53 respectively. After each channel word the contents of the memories in the integrators 51 and 53 are applied to the signal combining unit 58 through the squaring element 69.2 or 69.3 respectively. In the signal combining units the values of three squaring elements 69.1, 69.2 and 69.3 are added together after weighting as required.

A similar operation is performed on the channel word $CW_2$ in the multipliers 54 and 56, the integrators 55 and 57 and the squaring elements 69.5 and 69.6. The output signals of the signal combining units 58 and 59 which units are arranged, for example, as adders, are again the error signals $e_1$ and $e_2$ respectively, from which the comparator 34 derives the control signal cs in the manner described hereinbefore.

If the control signal $cs_1$ is generated, as described hereinbefore, the control signal is additionally applied to the memories in the integrators 55 and 57 and the contents of the memories in the integrators 51 and 53 are transferred to the memories of the integrators 55 and 57 respectively, through the lines 61 and 62. On the other hand, if control signal $cs_2$ was generated, the contents of the memories in the integrators 55 and 57 will be transferred to the memories of the integrators 51 and 53 respectively, under the influence of this control signal through the lines 63 and 64.

Self-evidently, if one wishes to obtain an additional dip in the frequency spectrum at a third frequency $f_3$, the control signal generating means 17' is to comprise two additional branches from the input 15 to the adder 58, each branch including a series connection of a multiplier, an integrator and a squaring element and multiplications of $\sin w_3 t$ and $\cos w_3 t$ ($w_3 = 2\pi f_3$) being realised in the multipliers. Likewise, two additional branches leading from the input 16 to the adder 59 are necessary, also including each a series connection of a multiplier, an integrator and a squaring element. Here too the multipliers perform multiplications by $\sin w_3 t$ and $\cos w_3 t$. Depending on the control signal cs obtained, the contents of the integrators in the additional branches leading from the input 15 to the adder 58 are transferred to the memories of the integrators included in the additional branches leading from the input 16 to the adder 59, or vice versa.

It should be observed in this context that the amplitude of the pilot signal as imposed by the generator 35 in the circuit of FIG. 5, is to be selected in such a way that the control is also capable of realising the dips at one or more frequencies by means of the circuit of FIG. 5. This means that the amplitude of the pilot signal in the generator 35 is to be adjusted to an optimum value, which is to say, not too large.

Figure 8A:
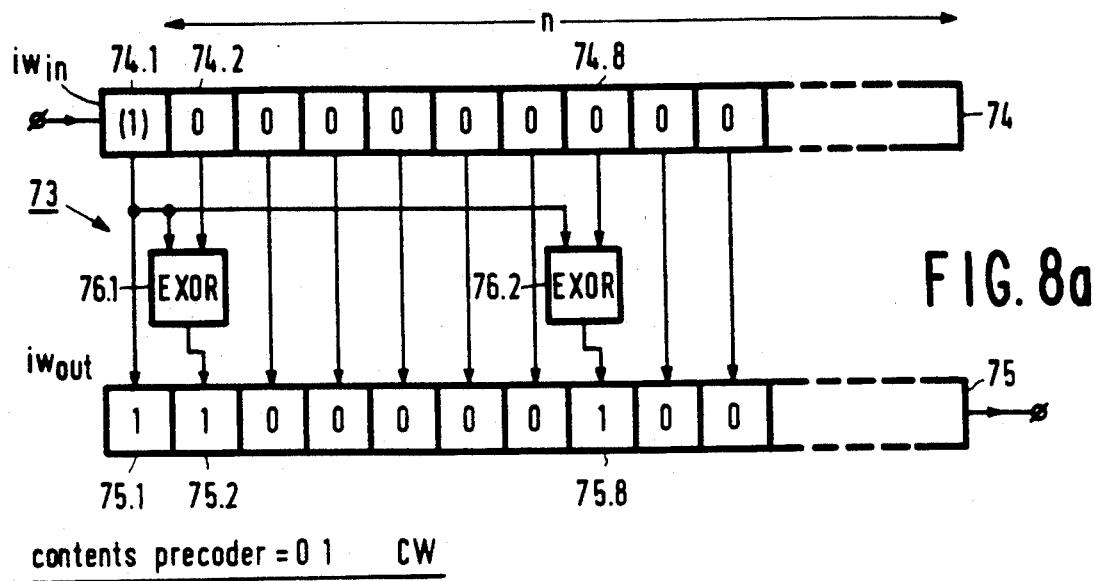
FIGS. 8a, b, c and d shows the signal combining means as it can be inserted between the signal affixing means and the aT precoder.

FIG. 8a shows that a signal combining means 73 may be inserted between the output 9 of the signal affixing means 4 in FIG. 1 and the input of the aT precoder 11. Between the output 8 of the signal affixing means 4 in FIG. 1 and the input 12 of the aT precoder 10 a similar signal combining means may be inserted. FIG. 8a shows a memory 74 in which the $(n+1)$-bit information word obtained in the signal affixing means 4 may be stored. This memory 76 may form part of the signal affixing means 4 or part of the signal combining means 73. The signal combining means 73 comprises at least one signal combining unit, for example, in the form of an EXOR. FIG. 8a shows two such combining units 76.1 and 76.2. An EXOR combines the 1-bit digital word affixed to the n-bit information word to the $i^{th}$ bit of this n-bit information word to obtain the $i^{th}$ bit of a new information word which is applied to a memory 75 together with the 1-bit digital word and stored in this memory as a new $(n+1)$-bit information word. The memory 75 may form part of the signal combining units 73 or part of the aT precoder 10 or 11.

FIG. 8a shows an EXOR 76.1 which combines the 1-bit digital word stored at the memory location 74.1 with the first bit of the information word stored at the second memory location 74.2 of the memory 74. The output of the EXOR 76.1 is coupled to the input of the second memory location 75.2 in the memory 75. Furthermore, a second EXOR 76.2 is available which in this case combines the contents of the memory locations 74.1 and 74.8 to obtain the content of the memory location 75.8 in the memory 75.

The further memory locations in the memory 74 are directly coupled to the inputs of the corresponding memory locations of the memory 75. The new (n+1)-bit information word thus obtained and stored in the memory 75 is now applied to the aT precoder.

Figure 8B:
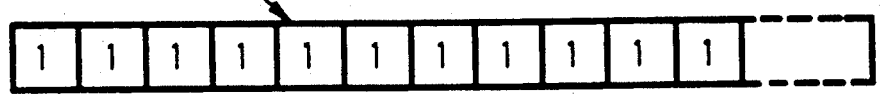
Figure 8C:
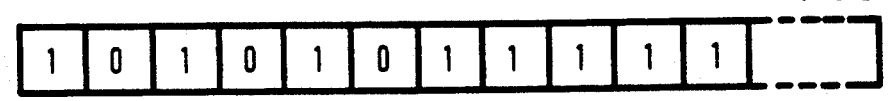

FIG. 8b shows the (n+1)-bit channel word that would have been obtained after 2 T precoding of the (n+1)-bit information word present in the memory 74 and FIG. 8c shows the (n+1)-bit channel word that would have been obtained after 2 T precoding of the (n+1)-bit information word present in the memory 75. The above holds under the assumption that in both cases the content of the aT precoder was "01".

The advantage of the extension by the EXOR 76.1 is that as a result the odd bits in the n-bit information word can also be influenced by the affixed 1-bit digital word. This holds for each next EXOR, such as the EXOR 76.2. For that matter, FIG. 8c distinctly shows that from the memory location 75.8 onwards all bits are "1" again.

As will be further explained hereinafter the PR4 detection on reproduction provides that the detected channel words again look like the (n+1)-bit information words as they were stored in the memory 75.

Figure 8D:
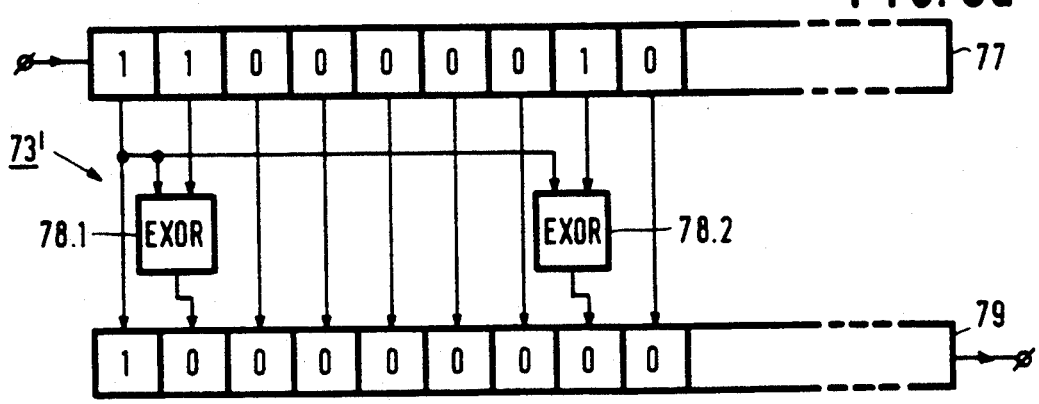

On the reproduction side there should also be a signal combining means 73' as represented in FIG. 8d. The combining means 73' is actually identical with the combining means 73. In the memory 77, after PR4 detection, the (n+1)-bit information word present in the memory 75 appears. After this (n+1)-bit information word is processed in the EXOR's 78.1 and 78.2 the original (n+1)-bit information word stored in the memory 74 of FIG. 8a is again obtained in the memory 79.

Needless to observe that, according to wishes, the signal combining means 73 (and thus also 73') may comprise a single or rather more than two EXOR's.

Figure 9A:
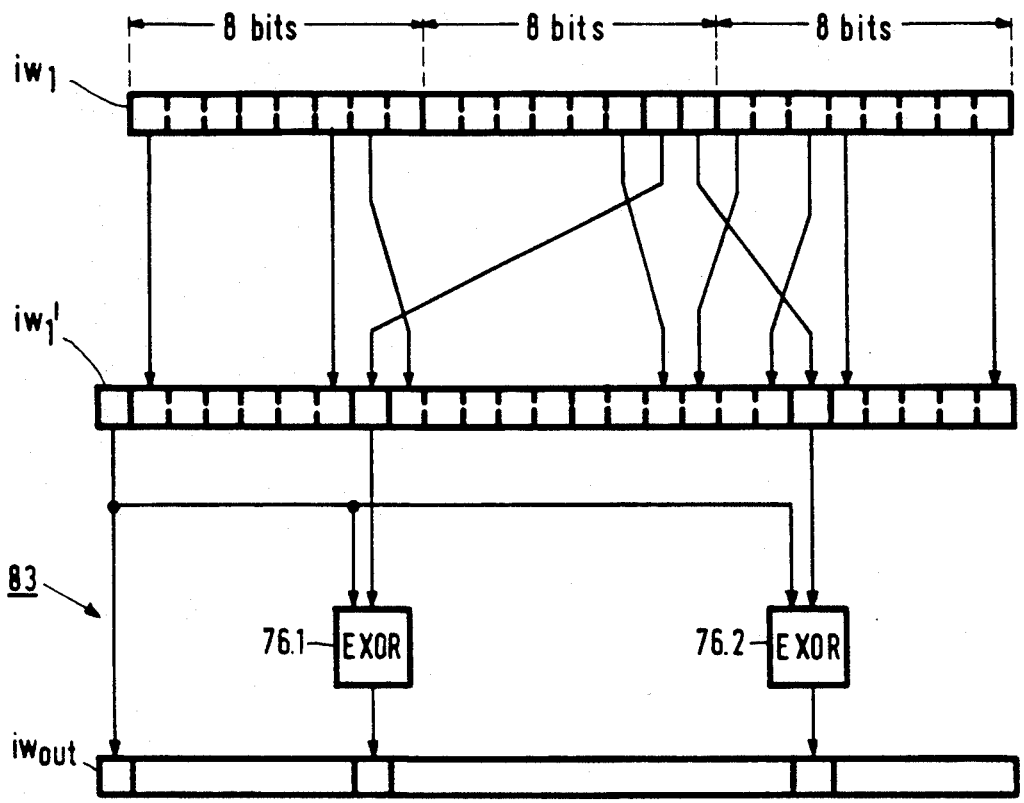
FIGS. 9a and 9b shows a further exemplary embodiment of the signal combining means.

FIG. 9 shows another embodiment of the step in the signal combining means. As already observed hereinbefore the 24-bit information words are obtained by combining three 8-bit information words. This is shown in FIG. 9a. Now, if there are two or more exclusive-OR gates in the signal combining means 83, preferably only bits belonging to one of the 8-bit information words will be combined with the 1-bit digital word. The reason for this is that one wishes to avoid error propagation during reproduction, which propagation is a consequence of an erroneous reading of the affixed bit.

In order to still realise a correct spreading of the EXOR's over the 25-bit information word, one or more of the bits of the 8-bit information word concerned change places. This is shown in FIG. 9a.

For reducing the influence of the aforementioned erroneous reading of the extra bit, one preferably combines the least significant bits of an 8-bit information word with the affixed bit in the signal combining means 83. From FIG. 9a it is evident that the two least significant bits of the second 8-bit word included in the 24-bit information word is combined with the extra bit. Thereto, the 24-bit information word $iw_1$ is converted to a 24-bit information word $iw_1'$, while the bits 15 and 16 of the information word $iw_1$ are moved to the positions 17 and 19 in the information word $iw_1'$. The bits 1 to 6 and 20 to 24 retain their positions during this move. The bits 7 to 14 move one position to the right and the bits 17, 18 and 19 one position to the left.

Subsequently, the extra bit is affixed and the combining operation is performed in the combining unit 83. The information word $iw_{out}$ thus obtained is applied to the precoder.

Figure 9B:
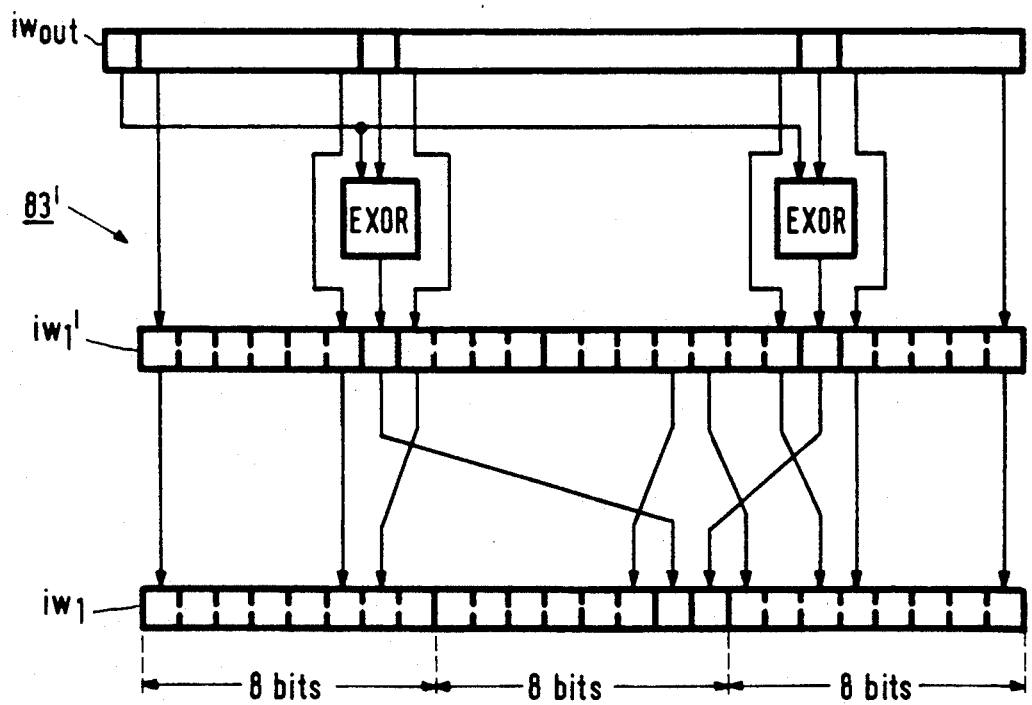

FIG. 9b shows the reverse process during reproduction. The reproduction provides the word $iw_{out}$ which is converted by means of the combining unit 83' in the same fashion as represented in FIG. 8d. The bits 7 and 19 are then to be returned to their correct positions after which the original 24-bit information word $iw_1$ is obtained.

Figure 10:
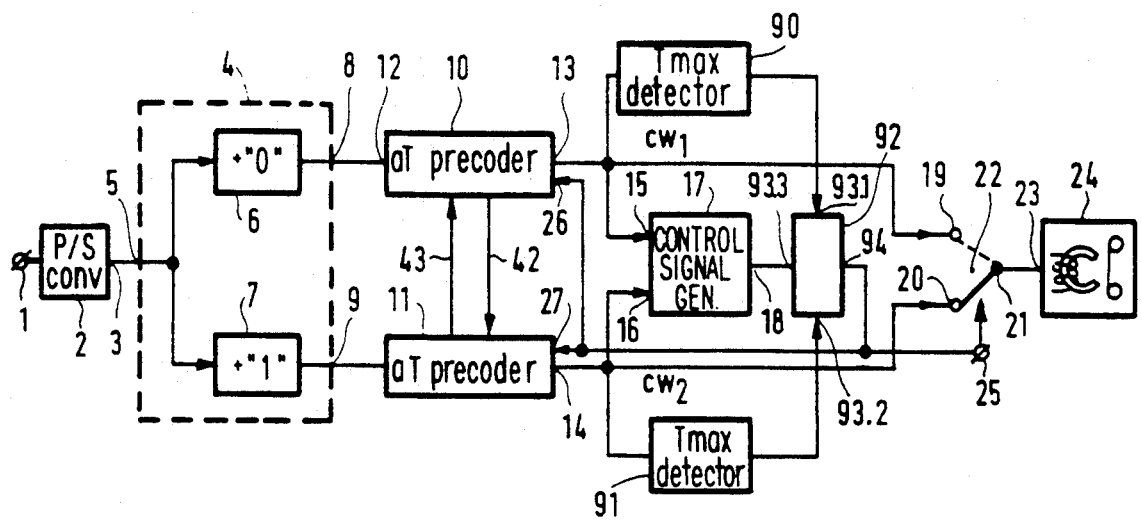
FIG. 10 shows a third exemplary embodiment of the device.

An extension to the circuit as shown in FIG. 1 is shown in FIG. 10. The output 13 of the precoder 10 is then coupled to the input of a "larger than $T_{max}$" detector 90. The output 14 of the precoder 11 is then also coupled to the input of a $T_{max}$ detector 91. Let us assume that the maximum number of "zeros" or "ones" in the serial data stream of the channel words is equal to nine, detectors 90 and 91 will then generate control signals at their outputs if in the serial data stream of the channel words $CW_1$ and $CW_2$ respectively, more than nine successive "zeros" or "ones" occur. The outputs of the detectors 90 and 91 are coupled to the inputs 93.1 and 93.2 respectively, of a decision unit 92 which is arranged downstream of the control signal generating means 17.

In this respect it should be observed that for the $T_{max}$ detection it is possible to look beyond the boundaries of the channel words to find if a sequence of successive "zeros" or "ones" occurs larger than the permitted number.

If the detectors do not generate control signals at their outputs, the control signal cs at the output 18 of the means 17, which signal is fed to the input 93.3 of the decision circuit 92, is transferred to the output 94 of this circuit 92. The device then operates in the fashion as described with reference to FIG. 1.

Let us assume that the detector 90 generates a control signal. This means that for the channel word $CW_1$ it holds that the maximum number of "zeros" or "ones" in the serial data stream at terminal 21 would be exceeded. This control signal of the detector 90 is applied to the input 93.1 and provides that the control signal cs of the means 17 is blocked in the decision circuit 92. The decision circuit 92 now generates of itself the second control signal $cs_2$ so that it is decided to apply the channel word $CW_2$ to the recording device 24 through the switching means 22.

Conversely, if the detector 91 generates a control signal, the decision circuit 92 will likewise block the control signal of the means 17 and generate of itself a control signal $cs_1$ at the output 94, so that the switching means will assume the position in which terminal 19 is linked to terminal 21. The channel word $CW_1$ is now applied to the recording device 24.

Alternatively, it is possible for the two detectors 90 and 91 to generate a control signal and apply this control signal to the inputs 93.1 and 93.2 of the decision circuit. The circuit 92 will also in this case block the control signal cs of the unit 17. If fewer successive "zeros" or "ones" turn out to occur in the serial data stream at the output of precoder 10 than in the serial data steam at the output of precoder 11, the decision circuit 92 will generate the control signal $cs_1$ so that the channel word $CW_1$ is transferred. Self-evidently, the two detectors 90 and 91 are thereto to comprise means for determining the maximum number of "zeros" or "ones" in the output signals of precoders 10 and 11 and the maximum numbers for the two channel words are to be applied to the decision circuit 92 so that this circuit 92 can generate the desired control signal cs.

It should be observed in this respect that once a decision on either of the channel words has been made, the information available in the $T_{max}$ detectors 90 and 91 is made equal again under the influence of the control signal at the output of circuit 92, in the same manner as already described with reference to the precoders 10 and 11 and the integrators in FIGS. 4 and 5.

Obviously, the extension of the device of FIG. 1 as described with reference to FIGS. 8 and 9 can also be applied to the device of FIG. 10.

Affixing a sync word to the serial data stream of the channel words is effected as follows.

Let us assume that the $T_{max}$ in the data stream has been determined to be 9 bits in the manner described hereinbefore. In order to detect a sync word in this data stream this sync word is to be unique. A possibility is a sync word in which, for example, 10 successive "zeros" or "ones" occur.

Figure 11:
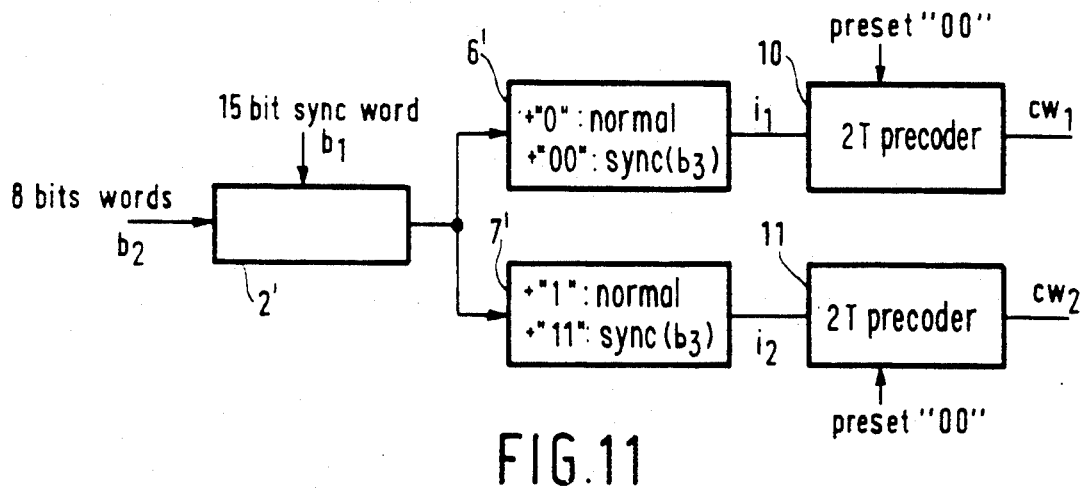
FIGS. 11 and 12 show the sync information affixed to the serial data stream of the channel words.

FIG. 11 shows how such a sync word can be accommodated in the data stream of the channel words. The parallel-to-serial converter 2' is arranged for combining three 8-bit digital words to 24-bit information words as described hereinbefore. At regular recursive instants (sync instants) only a single 8-bit digital word $b_2$ in lieu of three 8-bit digital words is combined with a 15-bit sync word $b_1$ in the form of 011000000001101, cf. FIG. 12, whilst the sync word $b_1$ comes first and then the 8-bit digital word $b_2$. In the signal affixing unit 6' a two-bit word $b_3$ equal to "00" is affixed to this 23-bit word so as to obtain a 25-bit information word $i_1$ which is applied to the 2T precoder 10. In the signal affixing means 7' a two-bit word $b_3$ equal to "11" is affixed to this 23-bit word also to obtain a 25-bit information word $i_2$ which is to be applied to the 2T precoder 11.

The two-bit word $b_3$ is prefixed to the 23-bit word in order to obtain the 25-bit information words. In this example these two bits are in fact the two most significant bits of the 25-bit information words.

Figure 12:
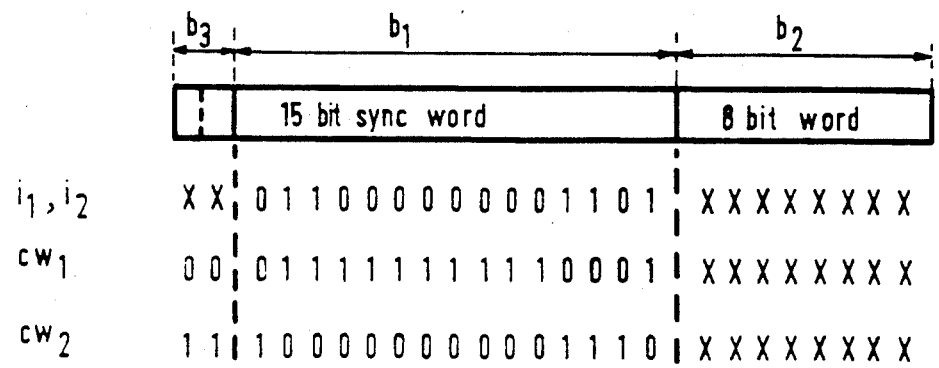

The moment the information words $i_1$ and $i_2$ are applied to the respective precoders 10 and 11, these precoders are first preset to the contents of their two memory locations $x_1$, $x_2$ i.e. "00". After an encoding operation in the precoders these information words $i_1$ and $i_2$ produce the channel words $CW_1$ and $CW_2$ as they are represented in FIG. 12. It will be evident that the two channel words can be used for the synchronization since they comprise ten successive "ones" or "zeros" respectively, so that these channel words can be detected when they are read out by a sync detector.

Needless to observe that the $T_{max}$ detectors 90 and 91 are to be switched off during the period of time in which the precoders 13 and 14 produce the encoded 15-bit sync word.

Figure 13A:
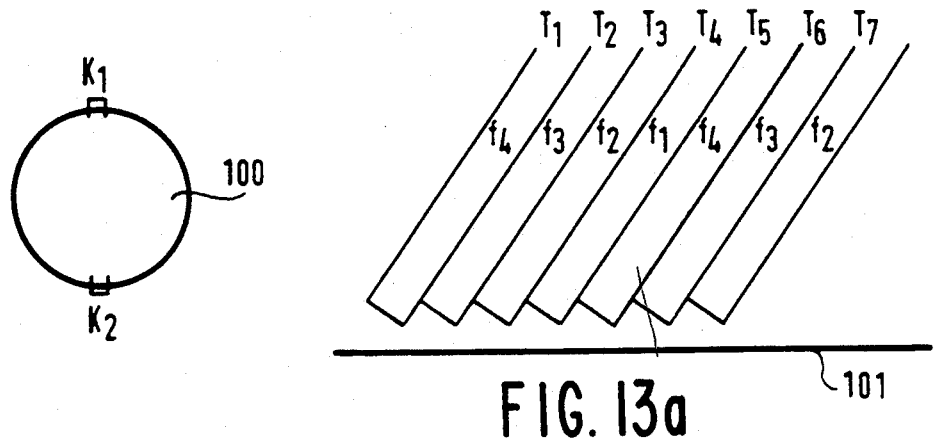
FIGS. 13(a, b and c) shows a number of possible applications of the device according to the invention in a recording device for recording the serial data stream of channel words on a magnetic record carrier.

FIG. 13 shows a number of possible applications to the devices described hereinbefore for magnetic channel word recording. In FIG. 13a a recording device according to the helical scan principle is depicted in which two write heads $K_1$ and $K_2$ are positioned diametrically opposite each other on a rotatable head drum 100. The record carrier is wound over 180° around the head drum. The heads $K_1$ and $K_2$ successively record the tracks $T_1$, $T_2$, $T_3$ ... and so on on the record carrier 101, the even tracks being recorded by, for example, head $K_2$ and the odd tracks by head $K_1$.

Figure 14:
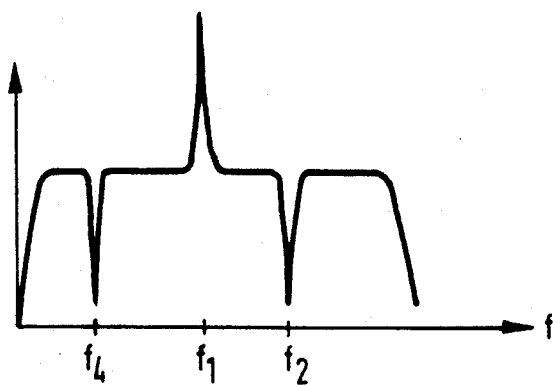
FIGS. 14 and 15 show a number of frequency characteristics of the serial data stream of the channel words.

By means of the devices described hereinbefore, the channel words recorded in successive tracks are each time extended by pilot signals with different frequencies. FIG. 13a shows cycles of four pilot signals with different frequencies $f_1$, $f_2$, $f_3$ and $f_4$. The frequency characteristic of the signal as recorded, for example, in track $T_4$ is diagrammatically shown in FIG. 14. In addition to the pilot signal at a frequency $f_1$, there are dips at the frequencies $f=0$, $f=f_4$ and $f=f_2$.

It is an object of the pilot signals to enable tracking during reproduction. Also the crosstalk of the pilot signals from the two adjacent tracks $T_3$ and $T_5$ is read out when the track $T_4$ is read by the head $K_2$. From this composite signal a tracking control signal is derived in response to which the read head is positioned on the track to be read, for example by driving a piezoelement on which the head is installed, or by controlling the tape transport. Reading the pilot signal crosstalk from the adjacent tracks $T_3$ and $T_5$ means that the crosstalk of the pilot signals $f_2$ and $f_4$ is to be read from the respective tracks $T_3$ and $T_5$.

In order to have this measurement disturbed the least possible by the signal in the track $T_4$, the dips are introduced with $f_4$ and $f_2$. It may be evident that for the other tracks frequency characteristics are valid which are similar to the frequency characteristic shown in FIG. 14. The peak then occurs at a different frequency ($f_2$, $f_3$ or $f_4$), and so do the dips (at $f_1$ and $f_3$ respectively, $f_2$ and $f_4$ respectively and $f_3$ and $f_1$ respectively).

The detection of the pilot signal during the reading operation, to realise tracking, is extensively discussed in aforementioned European Patent Application so that no further explanation is necessary here.

Figure 13B:
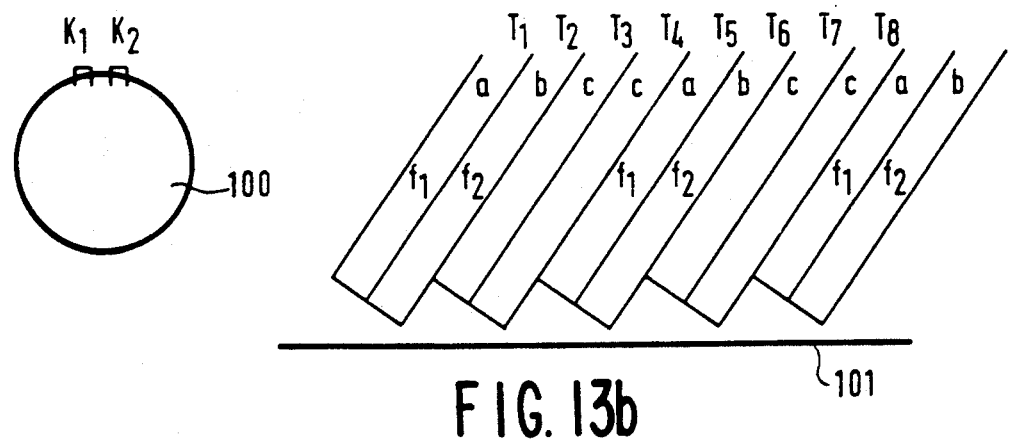

FIG. 13b shows two adjacent and rigidly intercoupled heads $K_1$ and $K_2$. These heads $K_1$, $K_2$ record track pairs $T_1$, $T_2$; $T_3$, $T_4$; $T_5$, $T_6$; ... and so on during successive revolutions of the head drum 100. The record carrier 101 can be wrapped around the head drum 100 at an arbitrary angle. The letters a, b and c in the tracks in FIG. 6b refer to the frequency characteristics in FIGS. 15a, b and c respectively. These frequency characteristics denote the frequency characteristics of the information recorded in the tracks.

Figure 15A:
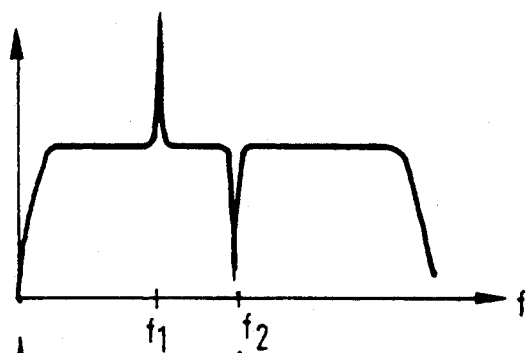
Figure 15B:
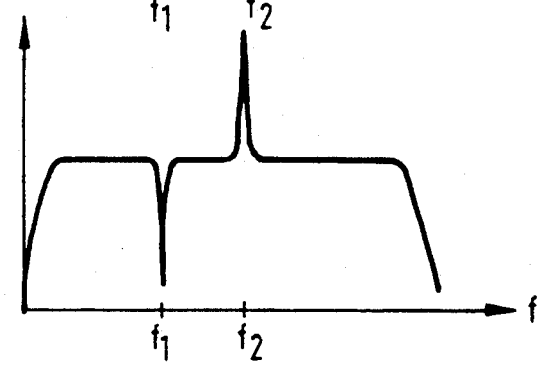

When the track pairs $T_1$ and $T_2$ are read by the heads $K_1$ and $K_2$ respectively, $K_1$, reading the information from track $T_1$, also reads the crosstalk of the pilot signal $f_2$ from track $T_2$. In order to enable an optimum reading operation, preferably a dip at this frequency $f_2$, cf. FIG. 15a, is provided in the frequency characteristic of the signal recorded in track $T_1$. The head $K_2$ likewise reads the information from the track $T_2$ and also the crosstalk of the pilot signal $f_1$ from the track $T_1$. Therefore, a dip preferably occurs at the frequency $f_1$, cf. FIG. 15b, in the frequency characteristic of the information in track $T_2$.

From the read crosstalk signals a control signal can be derived which may be used to realize tracking during the reading operation. The pair of heads $K_1$, $K_2$ is thereto installed on a piezoelement or the tracking is performed by controlling the transport speed of the record carrier.

If the heads $K_1$ and $K_2$ subsequently read the pair of tracks $T_3$, $T_4$, head $K_1$, reading the track $T_3$, will also detect crosstalk of the pilot signal $f_2$ from the track $T_2$ and the head $K_2$ will detect the crosstalk of the pilot signal $f_1$ from the track $T_5$. In order to realise the appropriate control signal for the tracking, signal inversion is first to be applied to the two detected crosstalk signals.

Figure 15C:
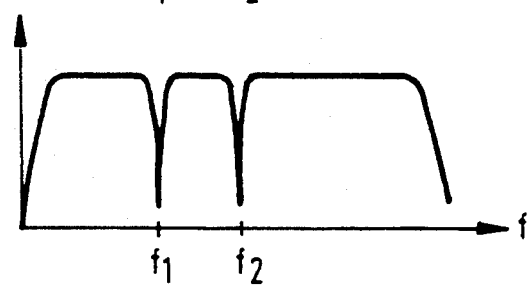

For the frequency characteristic of the signals in the track $T_3$, cf. FIG. 15c, a dip at the frequency $f_2$ (and not at the frequency $f_1$) might be sufficient and for the frequency characteristic of the signal in the track $T_4$ a dip at the frequency $f_1$ (and not at the frequency $f_2$). However, for an optimum detection of the pilot signal it is still preferred to have dips at both frequencies. Furthermore, the phases of the pilot signals $f_1$ in the tracks $T_1$, $T_5$, $T_9$, . . . and so on, are preferably mutually shifted through 90° so that when the pilot signal is detected in a track (for example $T_5$), this detection is effected to the least possible extent by the pilot signal $f_1$ in the tracks $T_1$ and $T_9$. Naturally, the same method is then applied to the pilot signals $f_2$ in the tracks $T_2$, $T_6$, . . . This measure relates to the fact that a sync detection is used during reproduction.

The detection of the pilot signals in the case of FIG. 13b, to realise tracking during reproduction, is extensively discussed in European Patent Application 343,726, so that a further explanation of this matter may be dispensed with.

Figure 13C:
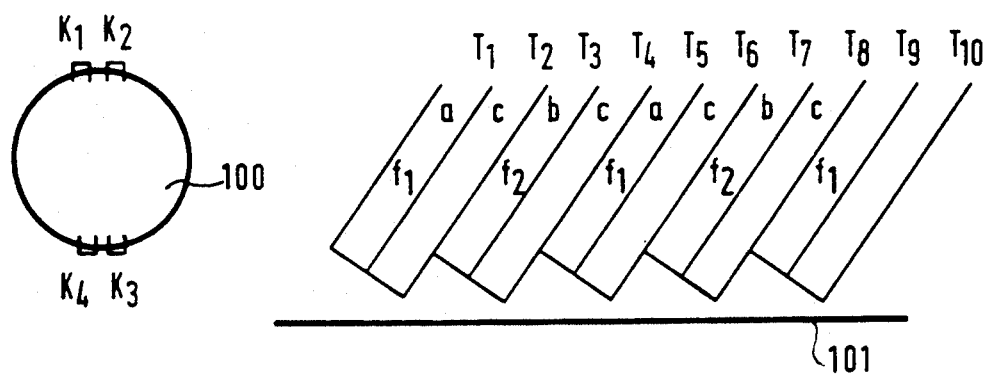

FIG. 13c shows two pairs of heads $K_1$, $K_2$ and $K_3$, $K_4$ disposed diametrically opposite each other on the head drum 100. The record carrier 101 is wrapped around the head drum 100 through 180°. The pair of heads $K_1$, $K_2$ reads the pairs of tracks $T_1$, $T_2$; $T_5$, $T_6$; $T_9$, $T_{10}$; . . . , and so on. The pair of heads $K_3$ and $K_4$ reads the pair of tracks $T_3$, $T_4$; $T_7$, $T_8$; . . . and so on. The letters a, b and c in the tracks again refer to the frequency characteristics in the respective FIGS. 15a, 15b and 15c.

When the pair of tracks $T_1$, $T_2$ is detected by the pair of heads $K_1$, $K_2$, the head $K_2$ additionally detects the crosstalk signals of the pilot signals $f_1$ and $f_2$ from the tracks $T_1$ and $T_3$ respectively. In response to these detected crosstalk signals a control signal for tracking can be derived. While the pair of tracks $T_3$, $T_4$ is detected by the pair of heads $K_3$, $K_4$ head $K_4$ additionally detects crosstalk signals of the pilot signals $f_2$ and $f_1$ from the tracks $T_3$ and $T_5$ respectively. In response thereto a control signal for tracking can again be derived.

Figure 16:
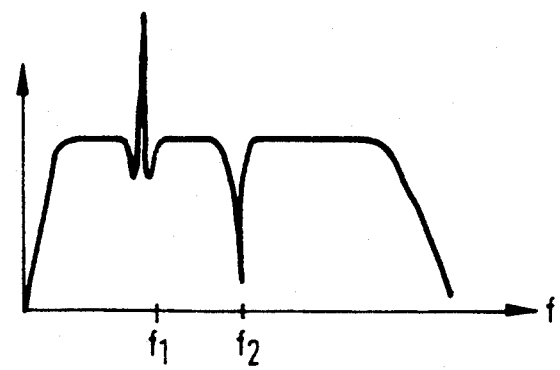
FIG. 16 shows another frequency characteristic of the serial data stream of the channel words.

A further improvement of the detection of a pilot signal, such as the pilot signal having the frequency $f_1$ in FIG. 15a, may be realised by effecting a dip in the frequency spectrum around frequency $f_1$ during the recording. This is represented in FIG. 16. It is clearly evident that the frequency spectrum is reduced around frequency $f_1$. This means that the signal-to-noise ratio for the detection of the pilot signal at the frequency $f_1$ is increased. To realise this, the circuit of FIG. 5 is to be extended. In FIG. 17 this extension is shown but only for half the circuit of FIG. 5, that is to say the top half, which is the circuit between the input 15 and the output 58.1 of the adder 58 in FIG. 5.

FIG. 17 shows an extension in the form of two additional branches comprising a signal combining unit 170 constituted by a subtractor, multipliers 172 and 173, integrators 174 and 175 and squaring elements 169.1 and 169.2. To a second input 176 of the subtractor 170 a a square wave having frequency $f_1$ as represented in FIG. 18b is applied. This square wave is produced by the source 171 and actually corresponds to the ideal shape of the pilot signal. The source 35 actually produces the integrated square wave signal as is represented in FIG. 18a.

In the subtractor 170 the square wave is subtracted from the signal at input 15. The differential signal is applied to multipliers 172 and 173 in which the differential signal is multiplied by $sinw_1t$ and $cosw_1t$ respectively. The signals thus obtained are reproduced in integrators 174 and 175 which again may have the shape as represented in FIG. 5. By means of squaring elements 169.1 and 169.2 the two signals are applied to the adder 58'.

Self-evidently, the integrators 174 and 175 have each two lines (not shown) connecting them to the corresponding integrators in the bottom half of the circuit of FIG. 5, so that the contents of the corresponding integrators in the two halves can again be made equal to each other under the influence of a control signal cs after each information word has been encoded.

Figure 17A:
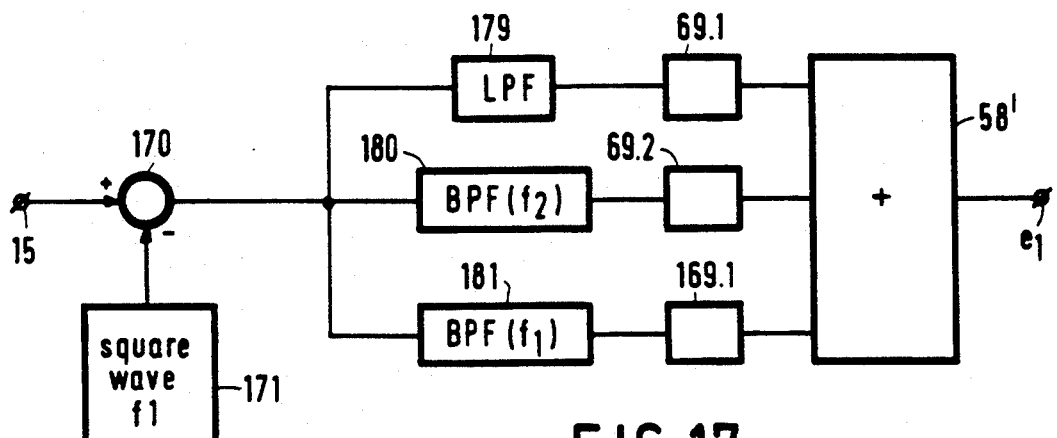
FIG. 17a shows a further embodiment of the control signal generating means shown in FIG. 17.

The control signal generating means as shown in FIGS. 4, 5 and 17 may also be realised in means of a slightly different circuit. This is shown by FIG. 17a, wherein the signal from generator 171 is now inserted before the branching into the various paths. The circuit of FIG. 17a is thus capable of inserting a pilot signal into the data stream with the frequency $f_1$. If no pilot signal is to be inserted into the data stream, the generator 171 may be omitted. The top branch comprises a low-pass filter 179. Due to the presence of this filter 179 the data stream is rendered free from D.C. current. The second branch comprises a bandpass filter 180 having a central frequency $f_2$. Due to the presence of this filter 180 the dip is realised with frequency $f_2$. The dip around the peak at $f_1$ is realised due to the presence of the bandpass filter 181 having central frequency $f_1$.

A device for detecting the channel words and subsequently decoding these channel words into information words is shown in FIG. 19. The device comprises a read head 185 coupled to an input 186 of a PR4 detector 187, of which an output 188 is coupled to an input 189 of a decoding unit 190. An output 191 of the decoding unit 190 is coupled to the output terminal 192.

In addition, the output of the read head 185 is coupled to a pilot signal detector 193 comprising, for example, filters having central frequencies lying near the frequency of the pilot signal. The detector 193 produces therefrom the tracking control signal at an output 194.

The decoding unit 190 receives at its input the (n+1)-bit information words. The decoding nit 190 comprises a sync signal detector 195 which detects from the serial data stream of the information words the sync word $b_1$ as is shown in FIG. 12. Once the sync word $b_1$ has been detected the decoder 190 knows at which positions in the serial data stream of the (n+1)-bit information words the 1-bit digital words are found. The control signal is supplied by the sync detector 195 to a gating unit 196 in decoding unit 190 which removes the 1-bit digital words from the serial data stream of the information words. The original data stream of the n-bit information words will then appear at the output 192.

Figure 20:
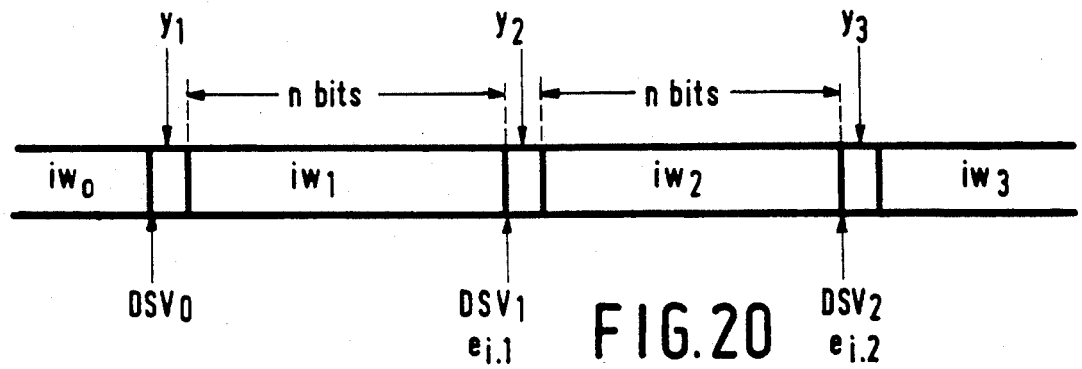
FIG. 20 shows the serial data stream of a number of successive information words.
Figure 21:
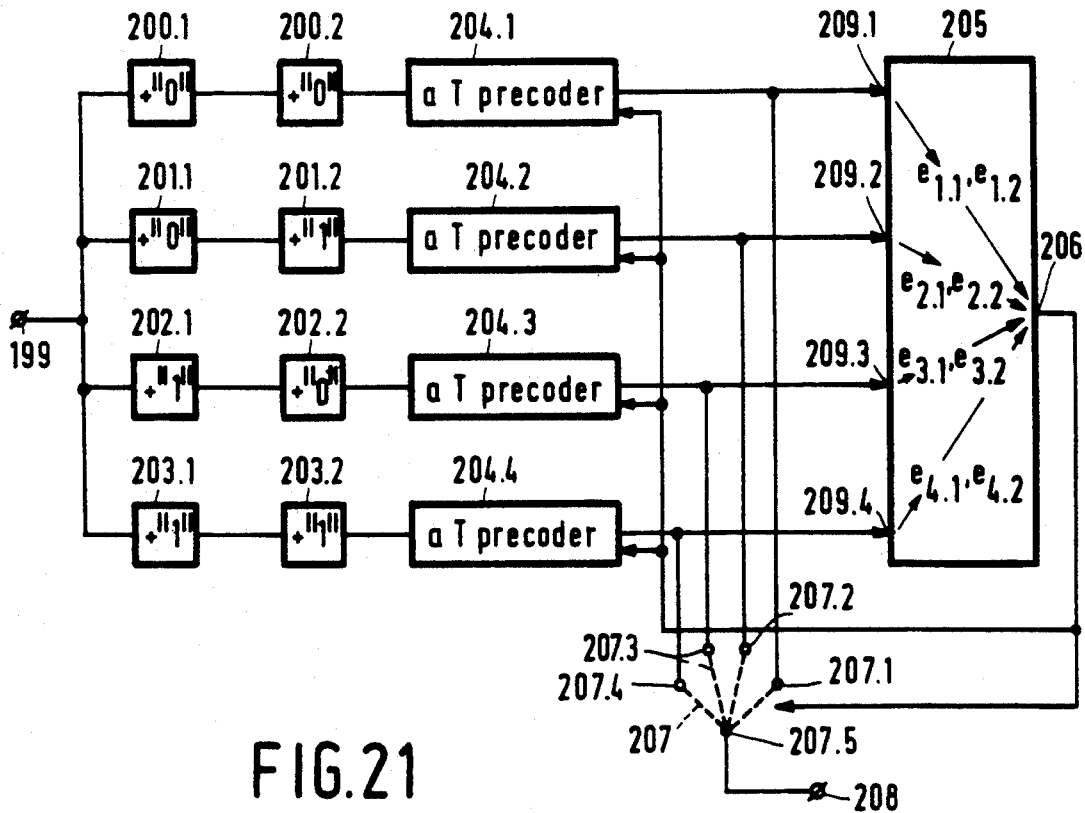
FIG. 21 shows a device looking ahead during the encoding operation to beyond one information word to be encoded.

The FIGS. 20 and 21 show a device in which, contrary to the device described hereinbefore, one looks ahead beyond a single information word for determining the 1-bit digital word to be affixed to an n-bit information word $iw_1$.

FIG. 20 shows the serial data stream of the successive information words $iw_1$, $iw_2$ and $iw_3$. A 1-bit digital word, referenced $y_1$, is to be affixed to the information word $iw_1$ and a 1-bit digital word, referenced $y_2$, to the successive information word $iw_2$.

The running digital sum value after aT precoding of the channel words obtained by the aT precoder from the (n+1)-bit information words will change from $DSV_0$, i.e. the running digital sum value in the serial data stream of the channel words up to the encoding instant of the information word $iw_1$, to $DSV_1$ due to the encoded information word $iw_1$, and thereafter to $DSV_2$, due to the encoded information word $iw_2$.

In the previous embodiments the selection for the bit $y_1$ to be affixed to the information word $iw_1$ was determined by the past ($DSV_0$) and by the information word $iw_1$, so that the digital sum value of the channel words including the encoded information word $iw_1$ is an optimum approximate of a desired variation for the digital sum value.

In the device shown in FIG. 21 the selection for $y_1$ is now also determined by the variation of the running digital sum value of the data stream of the channel words, including the encoded information word $iw_2$. Actually, a 1-bit digital word $y_1$ is added to the information word $iw_1$ and a 1-bit digital word $y_2$ is added to the information word $iw_2$, i.e. such words $y_1$ and $y_2$ that the running digital sum values $DSV_0$, $DSV_1$ and $DSV_2$ are optimum approximates of a desired running digital sum value.

FIG. 21 gives a diagrammatic representation of such a device. Through the input 199 the two information words $iw_1$ and $iw_2$ are applied to the device. The n-bit information word $iw_1$ is then stored in the units 200.2, 201.2, 202.2 and 203.2 in which a "0"-bit (in the units 200.2 and 202.2) or a "1"-bit (in the units 201.2 and 203.2) is affixed to the information word $iw_1$. The information word $iw_2$ is stored in the units 200.1, 201.1, 202.1 and 203.1, in which a "0"-bit (in the units 200.1 and 201.1) or a "1"-bit (in the units 202.1 and 203.1) is affixed to this information word $iw_2$. Subsequently, the four serial data streams of the two information words $iw_1$ and $iw_2$ to each of which a "0" or a "1" is affixed, are transported to precoders 204.1 to 204.4 in which the data streams of the two (n+1)-bit information words are encoded to data streams of two (n+1)-bit channel words. Thereafter, the four data streams are applied to the detector 205. The detector 205 then generates at its output 206 a control signal to be applied to the controllable switch 207 which, in response to the control signal, assumes a position in which one of the terminals 207.1, 207.2, 207.3 and 207.4 is connected to the terminal 207.5.

Let us assume that in response to the control signal the switch 207 assumes the position in which the terminal 207.2 is coupled to the terminal 207.5, this means that the output signal of the precoder 204.2 is presented at the output 208.

The operation of the device may be such that each time pairs of successive information words, such as $iw_1$ and $iw_2$ and consecutive pairs of successive information words, such as $iw_3$ and $iw_4$, $iw_5$ and $iw_6$, . . . and so on, are encoded in a single step in the manner described hereinbefore, and are presented at the output 208 as pairs of channel words. This implies that after the encoding of the pair of information words $iw_1$ and $iw_2$ to the pair of channel words $cw_1$ and $cw_2$, the contents in the memory locations in the four precoders 204.1 to 204.4 are again identical under the influence of the control signal of the detector 205. In the above example this would mean that the contents of the memory locations in the precoder 204.2 are copied to the memories of the precoders 204.1, 204.3 and 204.4.

The operation of the device may also be such that in the manner described hereinbefore the control signal is derived from two successively encoded information words $iw_1$ and $iw_2$, but that on the basis of this control signal only the encoded information word $iw_1$ is presented at the output 208 and that the procedure is reiterated for two successive information words $iw_2$ and $iw_3$, $iw_3$ and $iw_4$, . . . and so on.

In the previous example this would mean that the information word $iw_1$ encoded by the precoder 204.2 is presented at the output 208 and after the encoding of the information word $iw_1$ the contents of the memory locations in the precoder 204.2 are to be copied to all precoders for subsequently encoding the pair of information words $iw_2$ and $iw_3$.

The operation of the detector 205 will be explained below. The detector 205 may have a similar structure as one of the detectors of FIG. 4, 5 or 17.

Each of the branches from the inputs 209.1 to 209.4 to the comparator (not shown) included in the detector 205, produces an error signal $e_{i,1}$ and $e_{i,2}$ after the encoding of the (n+1)-bit information word $iw_1$ or the (n+1)-bit information word $iw_2$ respectively, cf. FIG. 20. These error signals are also shown in FIG. 21.

The decision criterion may be, for example that the magnitudes: $e_{i,1}^2 + e_{i,2}^2$ are determined for i ranging from 1 to 4.

Subsequently, the smallest of the four values is determined and this choice then determines which control signal is generated. In the previous example $e_{2,1}^2 + e_{2,2}^2$ appeared to produce the smallest value.

Self-evidently, the "looking ahead" may also imply looking ahead beyond more than two successive information words.

Needless to observe that although hardware arrangements have been described hereinbefore, the arrangement may naturally also be a software arrangement utilizing a microprocessor. Furthermore, it should be observed that the device as described with reference to the FIGS. 1, 8 and 10 is a parallel arrangement in the sense that with time the channel words from which the control signal is subsequently derived are generated more or less in parallel. Alternatively, it is possible that the channel words from which a choice can be made are derived consecutively. In that case only a single aT precoder 10, cf. FIG. 1 is necessary and a single unit 6, which unit then is to be capable of affixing both a "0" and a "1" to an n-bit information word. This solution does require more memory capacity for a temporary storage of the channel words obtained.

We claim:

1. A device for recording a digital information signal in an information track on a magnetic record carrier, and for converting, prior to recording, a n-bit information words in the presented digital information signal into (n+m)-bit channel words, where n and m are integers such that $m \geq 1$ and $n \geq m$, comprising:

an input terminal for receiving the n-bit information words, an encoding device having an input coupled to the input terminal and having an output, which encoding device comprises an aT precoder, a being an integer greater than or equal to two and T being the bit period, which encoding device is arranged for converting the n-bit information words into the (n+m)-bit channel words and for presenting the channel words at the output; and a recording device having an input coupled to the output of the encoding device, for recording the (n+m)-bit) channel words in the information track on the magnetic record carrier;

characterized in that:

the encoding device comprises signal affixing means for affixing an m-bit digital word, where m is equal to 1, to each consecutive n-bit information word to obtain an (n+1)-bit information word;

the aT precoder is arranged for converting the (n+1)-bit information words into (n+1)-bit channel words;

the encoding device further comprises control signal generating means for receiving the (n+1)-bit channel words from the aT precoder and deriving a control signal therefrom; and the signal affixing means is arranged for affixing a 1-bit digital word to an n-bit information word in response to said control signal, such that the running digital sum value of the output signal of the precoder has a desired pattern as a function of time.

2. Device as claimed in claim 1, characterized in that n is greater than or equal to 10.

3. Device as claimed in claim 2, characterized in that n is equal to 24.

4. Device as claimed in claim 1, characterized in that a is equal to 2 or 3.

5. Device as claimed in claim 1, characterized in that the signal affixing means is arranged for affixing each time a 1-bit digital word to an n-bit information word under the influence of said control signal, so that the frequency characteristic of the output signal of the aT precoder presents a dip at least one specific frequency value.

6. Device as claimed in claim 1, characterized in that the signal affixing means is arranged for affixing each time a 1-bit digital word to an n-bit information word under the influence of said control signal, so that the frequency characteristic of the output signal of the aT precoder presents a peak at a specific frequency value.

7. Device as claimed in claim 6, characterized in that the signal affixing means is furthermore arranged for affixing each time a 1-bit digital word to an n-bit digital word so that the frequency characteristic presents dips in the vicinity of said peak at said frequency value.

8. Device as claimed in claim 1, characterized in that the device comprises a $T_{max}$ determining means for determining the maximum number of successive "zeros" or "ones" in the output signal of the aT precoder, which means is arranged for generating a control signal if this maximum number of "zeros" or "ones" exceeds a specific threshold value, in that the device further includes blocking means for blocking the control signal of the control signal generating means under the influence of the control signal of the $T_{max}$ determining means and for generating then a control signal for the signal affixing means, and in that the signal affixing means is arranged for affixing a 1-bit digital word to the n-bit information word under the influence of the blocking means control signal so that either the maximum number of "zeros" or "ones" in the output signal of the aT precoder does not exceed said threshold value, or just that channel word is obtained having the smallest maximum number of "zeros" or "ones" in the precoder output channel words that may be obtained from the n-bit information word.

9. Device as claimed in claim 1, characterized in that the device further includes a signal combining means inserted between the signal affixing means and the aT precoder, in that the signal combining means is arranged for receiving (n+1)-bit information words at an input from the signal affixing means and for presenting (n+1)-bit information words at an output, and in that the signal combining means is arranged for combining the 1-bit digital word with the $i^{th}$ bit of the (n+1)-bit information word applied to its input so as to obtain an $i^{th}$ bit in the (n+1)-bit information word at its output.

10. Device as claimed in claim 9, characterized in that the signal combining means comprises at least one EXOR gate.

11. Device as claimed in claim 1, characterized in that a is equal to 2 or 3.

12. Device as claimed in claim 2, characterized in that a is equal to 2 or 3.

13. Device as claimed in claim 3, characterized in that a is equal to 2 or 3.

14. Device as claimed in claim 8, characterized in that the device further includes a signal combining means inserted between the signal affixing means and the aT precoder, in that the signal combining means in arranged for receiving (n+1)-bit information words at an input from the signal affixing means and for presenting (n+1)-bit information words at an output, and in that the signal combining means is arranged for combining the 1-bit digital word with the $i^{th}$ bit of the (n+1)-bit information word applied to its input so as to obtain an $i^{th}$ bit in the (n+1)-bit information word at its output.

15. Device as claimed in claim 14, characterized in that the device further includes a signal combining means inserted between the signal affixing means and the aT precoder, in that the signal combining means is arranged for receiving (n+1)-bit information words at an input from the signal affixing means and for presenting (n+1)-bit information words at an output, and in that the signal combining means is arranged for combining the 1-bit digital word with the $i^{th}$ bit of the (n+1)-bit information word applied to its input so as to obtain an $i^{th}$ bit in the (n+1)-bit information word at its output.

* * * * *

UNITED STATES PATENT AND TRADEMARK OFFICE
CERTIFICATE OF CORRECTION

PATENT NO. : 5,142,421

DATED : August 25, 1992

INVENTOR(S) : Josephus A.H.M. Kahlman and Wilhelmus J. van Gestel

It is certified that error appears in the above-identified patent and that said Letters Patent is hereby corrected as shown below:

On the title page,

<u>In the Abstract</u>:

Last line change "$n \ll 1$" to --$n \gg 1$; change "$n \leq 10$" to --$n \geq 10$--.

<u>In Claim 1</u>:

Column 16, line 59, delete "a".

Signed and Sealed this

Eighteenth Day of January, 1994

*Attest:*

BRUCE LEHMAN

*Attesting Officer*  Commissioner of Patents and Trademarks